(12) United States Patent
Saga

(10) Patent No.: US 7,989,526 B2
(45) Date of Patent: *Aug. 2, 2011

(54) FLAME RESISTANT SEMIAROMATIC POLYAMIDE RESIN COMPOSITIONS AND PROCESSES FOR THE PREPARATION OF SEMIAROMATIC POLYAMIDE RESIN COMPOSITIONS EXHIBITING INCREASED MELT FLOW AND ARTICLES THEREFROM

(75) Inventor: Yuji Saga, Utsunomiya (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,904

(22) Filed: Oct. 21, 2009

(65) Prior Publication Data

US 2010/0113655 A1    May 6, 2010

Related U.S. Application Data

(60) Provisional application No. 61/197,793, filed on Oct. 30, 2008.

(51) Int. Cl.
C08K 5/5313 (2006.01)

(52) U.S. Cl. ......... 524/126; 524/133; 524/296; 524/405

(58) Field of Classification Search ................. 524/126, 524/133, 296
See application file for complete search history.

(56) References Cited

U.S. PATENT DOCUMENTS

| 6,255,371 B1 | 7/2001 | Schlosser et al. |
| 2003/0018135 A1 | 1/2003 | Pagilagan et al. |
| 2006/0030693 A1 | 2/2006 | Martens et al. |

FOREIGN PATENT DOCUMENTS

WO    2006/015067    2/2006

Primary Examiner — Peter Szekely

(57) ABSTRACT

There is provided high temperature flame retarded semiaromatic polyamides which provide superior properties in molded articles while maintaining high flow in the molding process. The resin compositions include, in addition to the polyamide and flame retardant, aromatic organic acid and at least one inorganic reinforcing agent and/or filler. Processes for their preparation and articles made from these compositions are also disclosed.

20 Claims, No Drawings

US 7,989,526 B2

FLAME RESISTANT SEMIAROMATIC POLYAMIDE RESIN COMPOSITIONS AND PROCESSES FOR THE PREPARATION OF SEMIAROMATIC POLYAMIDE RESIN COMPOSITIONS EXHIBITING INCREASED MELT FLOW AND ARTICLES THEREFROM

CROSS REFERENCE TO RELATED APPLICATIONS

This application claims the benefit of U.S. Provisional Application No. 61/197,793, filed Oct. 30, 2008, which is incorporated herein by reference in its entirety.

FIELD OF THE INVENTION

The present invention relates to non-halogenated flame retardant thermoplastic semiaromatic polyamide compositions.

More particularly, the invention relates to such flame retardant thermoplastic semiaromatic polyamide composition which comprises selected phosphinates as flame retardant and inorganic reinforcing agent but which exhibit increased melt flow and similar physical properties when compared to conventional systems, and which are useful in Surface Mount Technology (SMT) applications (in which electronic and electrical components are mounted directly onto the surface of a printing circuit board(PCB) or other suitable compenet surface and which is a proven technology for creating electronic assemblies with higher packaging density), and a process of preparing such compositions by a melt-blending with at least one aromatic organic acid.

BACKGROUND OF THE INVENTION

SMT involves applying a solder-containing paste to a PCB, placing electrical and electronic components on appropriate places on the surface of the PCB, and passing the entire assembly through an infrared reflow oven that serves to melt the solder and permanently affix the components to the PCB. Older, through-hole methods required that holes be drilled and that each component be individually soldered in place. SMT has permitted the manufacture of smaller and denser layouts than were possible using through-hole techniques, and the resulting boards are generally cheaper to manufacture.

Because of their physical properties such as high mechanical properties and high heat defelection temperatures, flame-retarded, reinforced high-melting polyamides such as those based on terephthalic acid, adipic acid, and hexamethylenediamine or terephthalic acid, hexamethylenediamine, and 2-methyl-1,5-pentanediamine that have melting points greater than about 280° C. have been conventionally used for those electrical and electronic components for SMT application. The components are made from such polyamide composition by using a melt-processing method such as injection molding.

High melt flow (or low melt viscosity, as these terms are used interchangeably) is a very desirable characteristic of a melt-processable polymer resin composition, as it allows for greater ease of use in processes such as injection molding. A composition with higher melt flow or lower melt viscosity can be injection molded with greater ease compared to another resin that does not possess this characteristic. Such a composition has the capability of filling a mold to a much greater extent at lower injection pressures and temperatures and a greater capability to fill intricate mold designs with thin cross-sections. For a linear polymer there is generally a positive correlation between polymer molecular weight and melt viscosity.

It is also often desirable to add additional, often non-miscible, components such as glass reinforcing agents, or flame retardants to a polymer resin to achieve desired physical properties or flame retardancy. However, the presence of such components often leads to an increase in the melt viscosity of the resulting resin. Furthermore, these additional components are typically added using a melt blending process, and will preferably be sufficiently well dispersed in the polymer matrix to obtain optimal physical properties. The dispersal of the components during melt blending will often occur more efficiently when the polymer matrix has a high viscosity.

When the matrix polymer is a condensation polymer such as a polyamide, it is often possible to obtain a composition that has both well dispersed additives and a low melt viscosity by using high molecular weight matrix polymer in conjunction with a molecular-weight reducing additive in the melt blending process. In this method, the matrix polymer will have a sufficiently high melt viscosity to ensure an adequate dispersion of additives and the action of the molecular-weight reducing agent will result in a lower molecular weight matrix polymer. U.S. patent application publication 2003/0018135 discloses the use of aliphatic organic acids in the preparation of impact modified polyamide compositions that have both good melt flow and toughness. However, it has been discovered that the use of aliphatic acids disclosed in this publication can lead to rapid corrosion of the steel elements of the processing equipment used in the melt blending processes.

When the composition contains flame retardant, it can be used in SMT applications. However because of the absorption of water associated with these polymers, voids are formed therein when they are heated in ovens during processing. The resulting parts are consequently undesirably deformed.

In response to these concerns, high temperature polyamides incorporating flame-retardants have been used and are generally satisfactory for conventional applications. However, there is increasingly a demand for higher melt temperature solder materials that have more stringent property requirements than those of current polyamides in the industry.

According to the down sizing trend of electrical & electronics devises, the need of high melt flow is increasing for the resins used in the SMT applications. U.S. patent application publication 2006/0030693 discloses the use of terephthalic acid as an agent to increase melt flow of a high temperature polyamide composition. However, it has been discovered that the use of terephthalic acid disclosed in this publication can lead to deterioration of resistance against the void formation at SMT process.

Also, out-gassing from the polyamide composition at a molding process may cause problems such as mold deposit on surface of mold cavities.

There is a need for a high temperature flame-retarded, reinforced polyamide molding composition which is suitable to withstand the severe constraints associated with the manufacture of electrical or electronic components. A feature of the present invention is its advantageous improved melt flow and less out-gassing that also can withstand higher oven temperatures without the formation of voids and the deformation of those molded components or parts.

SUMMARY OF THE INVENTION

The present invention, which allows the stated objective to be attained, concerns a flame-retarded, reinforced polyamide resin composition, comprising:

(a) about 30 to about 90 weight percent of a polyamide component comprising about 20 to 100 weight percent of at least one semiaromatic polyamide;
(b) flame retardant:
(c) about 0.01 to about 10 weight percent of at least one aromatic carboxylic acid, and
(d) about 20 to about 60 weight percent of at least one inorganic reinforcing agent and/or filler,
wherein the weight percentages of (a) and (d) are based on the total weight of the composition; wherein flame retardant (b) is present in an amount of about 10 to about 45 percent of the weight of polyamide (a); and wherein the weight percentages of (c) is based on the total weight of the polyamide (a).

The present invention is also directed to a process for the preparation of the flame-retarded, reinforced polyamide resin composition, comprising melt-blending a polyamide component (a), flame retardant (b), and inorganic reinforcing agent and/or filler (d) with 0.1 to 10 weight percent, based on the total weight of the polyamide (a), of at least one aromatic carboxylic acid(c), optionally, one or more additional components, such that molecular weight of the aromatic carboxylic acid is not lower than 180 g/mol.

In addition, articles of manufacture made from compositions according to the claimed process are disclosed and claimed herein.

DETAILED DESCRIPTION OF THE INVENTION

Polyamide

The polyamide component (a) used in the process of the present invention includes at least one semi-aromatic polyamide which are thermoplastic and may be one or more homopolymers, copolymers, terpolymers, or higher polymers that are derived from monomers containing aromatic groups. Examples of monomers containing aromatic groups are terephthalic acid and its derivatives, isophthalic acid and its derivatives, p-xylylenediamine and m-xylylenediamine. It is preferred that about 5 to about 75 mole percent of the monomers used to make the aromatic polyamide used in the present invention contain aromatic groups, and more preferred that about 10 to about 55 mole percent of these monomers contain aromatic groups.

The semiaromatic aromatic polyamide may be derived from one or more of adipic acid, sebacic acid, azelaic acid, dodecanedoic acid, terephthalic acid, isophthalic acid or their derivatives and other aliphatic and aromatic dicarboxylic acids and aliphatic $C_6$-$C_{20}$ alkylenediamines, aromatic diamines, and/or alicyclic diamines. Preferred diamines include hexamethylenediamine; 2-methylpentamethylenediamine; 2-methyloctamethylenediamine; trimethylhexamethylenediamine; 1,8-diaminooctane, 1,9-diaminononane; 1,10-diaminodecane; 1,12-diaminododecane; and m-xylylenediamine. It may also be derived from one or more lactams or amino acids such as 11-aminododecanoic acid, caprolactam, and laurolactam.

Examples of preferred semiaromatic polyamides include poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/hexamethylene isophthalamide copolyamide (polyamide 6,6/6,T/6,I), poly(caprolactam-hexamethylene terephthalamide) (polyamide 6/6,T), hexamethylene terephthalamide/hexamethylene isophthalamide (6,T/6,I) copolymer, polyamide 10,T/10,12, polyamide 10T/10,10 and the like.

The polyamide component (a) may further comprise one or more aliphatic and/or alicyclic polyamides. The aliphatic and/or alicyclic polyamides may be derived from aliphatic and/or alicyclic monomers such as one or more of adipic acid, sebacic acid, azelaic acid, dodecanedoic acid, or their derivatives and the like, aliphatic $C_6$-$C_{20}$ alkylenediamines, alicyclic diamines, lactams, and amino acids. Preferred diamines include bis(p-aminocyclohexyl)methane; hexamethylenediamine; 2-methylpentamethylenediamine; 2-methyloctamethylenediamine; trimethylhexamethylenediamine; 1,8-diaminooctane; 1,9-diaminononane; 1,10-diaminodecane; 1,12-diaminododecane; and m-xylylenediamine. Preferred lactams or amino acids include 11-aminododecanoic acid, caprolactam, and laurolactam.

Preferred aliphatic polyamides include aliphatic polyamides such as polyamide 6; polyamide 6,6; polyamide 4,6; polyamide 6,10; polyamide 6,12; polyamide 11; polyamide 12; polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; polyamide 6,13.

Flame Retardant

The polyamide resin composition of this invention advantageously provide improved melt flow and less out-gassing that also can withstand higher oven temperatures without the formation of voids and the deformation of those molded components or parts.

These advantages and benefits are provided by the polyamide resin composition comprising at least one flame retardant or flame retardant combinations (b) (such as disclosed in U.S. Pat. No. 6,255,371) and inorganic reinforcing agents and/or fillers (d).

Preferred flame retardants (b) for use with polyamides include bromine containing polystyrenes (such as brominated polystyrene, poly (bromostyrene) and copolymer of a halostyrene and glycidyl (meth)acrylate) and phosphorus containing compounds (such as polyphosphazenes and metal phosphinates).

More preferred flame retardant (b) comprises one or more of a phosphinate of the formula (I), a disphosphinate of the formula (II), or polymers of these wherein $R_1$ and $R_2$ are identical or different or are $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is one or more of calcium ions, magnesium ions, aluminum ions and zinc ions, m is 2 to 3; n is 1 or 3; x is 1 or 2. $R_1$ and $R_2$ may be identical or different and are preferably methyl, ethyl, n-propyl, isopropyl, n-butyl, tent-butyl, n-pentyl and/or phenyl. $R_3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminum ions or zinc ions.

These compounds are disclosed in U.S. Pat. No. 6,255,371, which is hereby incorporated by reference herein.

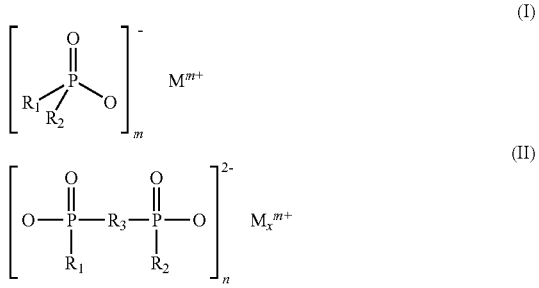

Preferred phosphinates are aluminum methylethylphosphinate, and, more preferably, aluminum diethylphosphinate.

Preferably, the flame retardant (b) is present in the composition in an amount that is about 10 to about 45 weight percent of the amount of polyamide component. (for instance, if the composition comprises 40 weight percent of polyamide component, it comprises about 4 to about 18 weight percent flame retardant.)

Preferably, the polyamide composition of the present invention may optionally further comprise a variety of zinc borate compounds as flame retardant synergists because they result in superior physical properties, such as the beneficial flow properties of the polyamide composition. By the term "zinc borate" is meant one or more compounds having the formula:

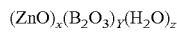

wherein X is preferably between 2 and 4, inclusive; Y is preferably between 1 and 3, inclusive; and Z is preferably between 0 and 5, inclusive. Zinc borate is sold by supplied by US Borax under the tradename Firebrake®. Preferred forms of zinc borate are those in which X=4, Y=1, and Z=1 (Firebrake® 415); in which X=2, Y=3, and Z=3.5 (Firebrake® 290); and in which X=2, Y=3, and Z=0 (Firebrake® 500).

When at least one of the metal phosphinates is contained in the polyamide composition, the polyamide composition may contain zinc borates. The zinc borate is present in an amount that is about 1 to about 5, or preferably about 1 to about 4, or more preferably about 1.2 to about 3.7, or yet more preferably about 1.4 about 3.6 percent of the weight of the phosphinates. For the purposes of determining the amount of zinc borate present, if the zinc borate is a hydrate (i.e., Z is not zero), the weight of the corresponding anhydrous form of the zinc borate is used, thus only the amounts of ZnO and $B_2O_3$ present in the zinc borate compound are considered to contribute to the zinc borate weight that is used in the calculation. As used herein in conjunction with the amount of zinc borate used in a composition, the term "zinc borate" refers to anhydrous form of the compound in question.

The composition may optionally further comprise one or more additional flame retardant synergists. Examples include silicone, metal oxides such as silica, boehmite, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide, metal powder such as aluminum, iron, titanium, manganese, zinc, molybdenum, cobalt, bismuth, chromium, tin, antimony, nickel, copper and tungsten, and metal salts such as barium metaborate, zinc carbonate, magnesium carbonate, calcium carbonate, and barium carbonate. Preferred synergists are boehmite (aluminum hydroxide oxide (AlO(OH))) and/or aluminum oxide. When used, the one or more synergists are present in about 10 to about 20 weight percent, based on the total weight of synergist and flame retardant.

Aromatic Carboxylic Acid

The compositions used in the present invention are in the form of a melt-blended. The ingredients are combined and melt-blended, using any reasonable melt-processing method, such as extrusion.

WO 2006/015067 discloses the melt-blending polyamide with an organic carboxylic acid that has a melting point that is no lower than about 10° C. less than the onset temperature of the melting point endotherm of the polyamide to reduce rates of corrosion of processing equipment.

Surprisingly it has been discovered that addition of aromatic organic acids such as aromatic carboxylic acids and their derivatives (c) without separate molecular-weight reducing additive in the melt blending process, results in a lower molecular weight matrix polymer and consequently increase melt flow of the melt-mixed polyamide resin composition.

The aromatic organic acid used in the present invention may be one or more monocarboxylic acids, dicarboxylic acids, tricarboxylic acids, higher acids, or aminoacids. It is desirable that molecular weight of the aromatic organic acid used in the present invention is not lower than 180 g/mol, preferably not lower than 220 g/mol.

The aromatic organic acid is preferably aromatic carboxylic acids selected such that it has a naphthalene ring in its chemical structure (naphthalene dicarboxylic acid), and particularly referred is 2,6-naphthalenedicarboxylic acid.

The melting point of the aromatic organic acid will more preferably be no lower than the onset temperature of the melting point endotherm of the semi-aromatic polyamide. As used herein in reference to the organic aromatic carboxylic acid, the term "melting point" refers to sublimation point or decomposition point if the aromatic organic acid does not have a melting point.

By "onset temperature of the melting point endotherm" of the polyamide is meant the extrapolated onset temperature of the melting curve of ho the polyamide (Tf) as measured by differential scanning calorimetry (DSC) following ASTM method D3418-82 (Reapproved 1988). If the polyamide has two or more melting point endotherms, the onset temperature of the lowest melting point endotherm is selected. If two or more polyamides are used, the onset temperature of the melting point endotherm of the polyamide with the lowest melting point endotherm onset temperature is chosen.

The aromatic organic acid is used at about 0.1 to about 5 weight percent, preferably at about 0.5 to about 2 weight percent, or more preferably at about 0.7 to about 1.5 weight percent in the melt blending process to increase of the composition, where the weight percentages are based on the total weight of polyamide.

Inorganic Reinforcing Agent and/or Filler

The composition may optionally comprise one or more inorganic reinforcing agents and/or fillers (d). Examples of inorganic reinforcing agents and/or fillers include one or more of glass fibers, glass flakes, kaolin, clay, talc, wollastonite, calcium carbonate, silica, carbon fibers, potassium titanate, etc. Glass fibers are preferred. The inorganic reinforcing agent and/or filler used in the present invention may be present in up to about 60 weight percent, or preferably in up to about 55 weight percent, or more preferably in up to about 50 weight percent, based on the total weight of the composition. When used, the reinforcing agents and/or fillers are preferably present in about 5 to about 60 weight percent, or more preferably in about 5 to about 55 weight percent, or more preferably in about 5 to 50 weight percent, based on the total weight of the composition.

Other Additives

The polyamide compositions produced by the process of the present invention may contain additives. Examples of additives include impact modifiers, inorganic reinforcing agents (such as glass fibers, carbon fibers, wollastonite etc.), fillers (such as talc, mica, glass flake etc.), plasticizers, thermal stabilizers, oxidative stabilizers, UV light stabilizers, flame retardants, chemical stabilizers, lubricants, colorants (such as carbon black, other pigments, dyes), mold-release agents, nucleating agents, nanoclays, etc.

In the process of the present invention, the polyamide and the aromatic organic acid and optional additional ingredients are melt-blended. Part of the materials may be mixed in a melt-mixer, and the rest of the materials may then be added and further melt-mixed until uniform.

Melt-blending may be carried out using any appropriate method known to those skilled in the art. Suitable methods may include using a single or twin-screw extruder, blender, kneader, Banbury mixer, molding machine, etc. Twin-screw extrusion is preferred, particularly when the process is used to prepare compositions that contain additives such as flame retardants, and reinforcing agents.

The compositions made from the process of the present invention have a high melt flow and may be conveniently formed into a variety of articles using injection molding, rotomolding and other melt-processing techniques. The articles are useful in SMT applications among others.

EXAMPLES

Examples 1-4 and Comparative Examples 1-3

The compositions of Examples 1-4 and Comparative Examples 1-3 were prepared by melt-blending the components shown in Table 1 in a twin-screw extruder. After exiting the extruder, the blended compositions were cooled and cut into pellets. The pellets were surface coated with 0.1 weight percent of calcium montanate.

The compounded product was molded in typical laboratory size molding machines into standard {fraction (1/32)}" ASTM flex bars. These flex bars were tested for SMT performance. More specifically, the temperature at which voids are formed in the bar and deformation occurs is known as the "blistering temperature". (The blistering is typically caused by a volatile (like water) which vaporizes during SMT heating and causes "blisters" in the part.) The SMT testing was done by conditioning the bars at 40 C. for 96 hours at 95% relative humidity. The moisture was then confirmed to be in the range of 2-3% moisture to simulate the conditions that the products are exposed to during storage. These conditioned bars were then passed through a SOLSYS-310IR Surface Mount Reflow System. The peak temperature of the part (measured by a thermocouple on the part) without "blistering" was recorded as the maximum SMT temperature. Because the temperature readings for this test were taken in 5 C. increments, the testing was conducted on these bars until the "blistering temperature" (as described above) was reached, and the peak temperature without blistering was recorded as the previous temperature increment. The results of the peak temperature are shown in Table 1.

In order to estimate out gassing from molten resin compositions at injection molding process, we measured weight loss of the resin compositions when pellets of them are held at 330° C. for 10 minutes under the air using TA Instruments' thermogravimetric analyzer, TGA2950

The melt viscosities of the resulting compositions were determined at 325° C. and 1000 so using a Kayeness rheometer and the results are shown in Table 1.

The following ingredients are used in Table 1:

Polyamide 6,T/6,6 refers to HTN 502HF with a melting point of about 312° C., available from E.I. du Pont de Neumours & Co., Inc.

2,6-NDA refers to 2,6-naphthalenedicarboxylic acid with a molecular weight of 216 g/mol, manufactured by BP Amoco Chemical Company.

TPA refers to terephthalic acid with a molecular weight of 166 g/mol, available from Junsei Chemical Co., Ltd.

Boehmite refers to Celasule BMT-33, available from Kawai Sekkai Kogyo.

Zinc borate refers to Firebrake® 290, a zinc borate, available from US Borax. The amount of anhydrous zinc borate in Firebrake® 290 is about 90 percents.

Flame retardant refers to Exolit® OP 1230, an aluminum diethylphosphinate available from Clariant.

Std-glass fiber refers to standard shape glass fiber FT756D, available from Owens Corning Japan Ltd.

Flat-glass refers to flat shape glass fiber 3PA-820S, available from Nitto Boseki Co., Ltd.

TABLE 1

| | Comp. Ex. 1 | Comp Ex. 2 | Ex. 1 | Comp. Ex. 3 | Ex. 2 | Ex. 3 | Ex. 4 |
|---|---|---|---|---|---|---|---|
| Polyamide 6,T/6,6 | 47.8 | 47.4 | 47.0 | 55.7 | 55.1 | 54.9 | 54.8 |
| 2,6-NDA | | | 0.8 | | 0.6 | 0.8 | 0.9 |
| TPA | | 0.4 | | | | | |
| Flame retardant | 10.3 | 10.3 | 10.3 | 12.0 | 12.0 | 12.0 | 12.0 |
| Boehmite | 1.7 | 1.7 | 1.7 | 2.0 | 2.0 | 2.0 | 2.0 |
| Zinc borate | 0.2 | 0.2 | 0.2 | 0.3 | 0.3 | 0.3 | 0.3 |
| Std-glass fibers | 20.0 | 20.0 | 20.0 | 30.0 | 30.0 | 30.0 | 30.0 |
| Flat-glass fiber | 20.0 | 20.0 | 20.0 | | | | |
| Peak temperature (° C.) | 245 | 230 | 245 | 255 | 255 | 255 | 245 |
| Melt Viscosity (Pa · s) | 110 | 86 | 65 | 110 | 104 | 89 | 83 |

Ingredient quantities are given in weight percentages based on the total weight of the composition.

What is claimed is:

1. A flame-retarded, reinforced polyamide resin composition, comprising:
   (a) about 30 to about 90 weight percent of a polyamide component comprising about 20 to 100 weight percent of at least one semiaromatic polyamide;
   (b) flame retardant:
   (c) about 0.01 to about 10 weight percent of at least one aromatic dicarboxylic acid whose molecular weight is higher than 180 g/mol, and
   (d) about 20 to about 60 weight percent of at least one inorganic agent selected from the group consisting of reinforcing agent and filler,
   wherein the weight percentages of (a) and (d) are based on the total weight of the composition; wherein flame retardant (b) is present in an amount of about 10 to about 45 percent of the weight of polyamide (a); and wherein the weight percentages of (c) is based on the total weight of the polyamide (a).

2. The composition of claim 1 wherein said aromatic dicarboxylic acid has a naphthalene ring in its chemical structure.

3. The composition of claim 1 wherein the aromatic dicarboxylic acid is 2,6-naphthalenedicarboxylic acid.

4. The composition of claim 1 wherein said aromatic dicarboxylic acid is present in about 0.1 to about 5 weight percent, based on the total weight of polyamide(a).

5. The composition of claim 1 wherein said semi-aromatic polyamide has a melting point endotherm with an onset temperature of between about 270° C. and about 330° C.

6. The composition of claim 1 wherein state of said flame retardant at temperatures below 320° C. is solid.

7. The composition of claim 1 wherein said flame retardant comprises a flame retardant selected from the group consisting of a phosphinate of the formula (I), a disphosphinate of the formula (II), polymers of formula (I), and polymers of formula (II), wherein $R_1$ and $R_2$ are identical or different and are selected from the group consisting of $C_1$-$C_6$ linear alkyl, $C_1$-$C_6$ branched alkyl, and aryl; $R_3$ is selected from the group consisting of $C_1$-$C_{10}$-linear alkylene, $C_1$-$C_{10}$-branched, $C_6$-$C_{10}$-arylene, $C_6$-$C_{10}$-alkylarylene and $C_6$-$C_{10}$ arylalkylene; M is one or more ions selected from the group of calcium ions, magnesium ions, aluminum ions and zinc ions, m is 2 to 3; n is 1 or 3; x is 1 or 2

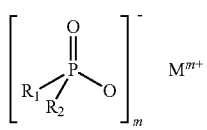
(I)

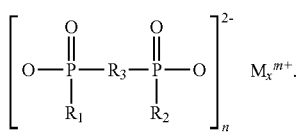
(II)

8. The composition of claim 1 wherein the resin composition further comprises zinc borate in an amount that is about 1 to about 5 percent of the weight of the flame retardant.

9. An article of manufacture made from composition of claim 1.

10. A process for the preparation of a resin composition exhibiting high melt flow, comprising melt-blending a thermoplastic polymer comprising at least one semi-aromatic polyamide with 0.01 to 10 weight percent, based on the total weight of the polyamide, of at least one aromatic dicarboxylic acid, and, optionally, one or more additional components, such that molecular weight of said aromatic dicarboxylic acid is no lower than 180 g/mol.

11. The process of claim 10 wherein the aromatic organic acid has a naphthalene ring in its chemical structure.

12. The process of claim 11 wherein the aromatic organic acid is 2,6-naphthalenedicarboxylic acid.

13. The process of claim 10 wherein about 0.1 to about 5 weight percent, based on the total weight of polyamide, of at least one aromatic dicarboxylic acid is used.

14. The process of claim 10 wherein the semi-aromatic polyamide has a melting point endotherm with an onset temperature of between about 270° C. and about 330° C.

15. The process of claim 10 wherein additional ingredients are present and comprise at least one reinforcing agent.

16. The process of claim 10 wherein additional ingredients are present and comprise at least one flame retardant.

17. The process of claim 16 wherein state of the flame retardant at temperatures below 320° C. is solid.

18. The process of claim 17 wherein the flame retardant comprises a flame retardant selected from the group consisting of a phosphinate of the formula (I), a disphosphinate of the formula (II), polymers of formula (I), and polymers of formula (II), wherein and are selected from the group consisting of $C_1$-$C_6$ linear alkyl, $C_1$-$C_6$ branched alkyl, and aryl; $R_3$ is selected from the group consisting of $C_1$-$C_{10}$-linear alkylene, $C_1$-$C_{10}$-branched, $C_6$-$C_{10}$-arylene, $C_6$-$C_{10}$-alkylarylene and $C_6$-$C_{10}$-arylalkylene;

M is one or more ions selected from the group of calcium ions, magnesium ions, aluminum ions and zinc ions, m is 2 to 3; n is 1 or 3; x is 1 or 2

(I)

(II)

19. The process of claim 18 wherein the thermoplastic polymer is at least one semi-aromatic polyamide the additional ingredients comprise zinc borate in an amount that is about 1 to about 5 percent of the weight of the flame retardant.

20. An article of manufacture made from compositions according to the process of claim 10.

* * * * *